US006823917B2

(12) United States Patent
Dods

(10) Patent No.: US 6,823,917 B2
(45) Date of Patent: Nov. 30, 2004

(54) LABEL PRINTER APPLICATOR UNWIND SENSOR

(75) Inventor: Steven M. Dods, Edwardsville, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 59 days.

(21) Appl. No.: 10/213,654

(22) Filed: Aug. 6, 2002

(65) Prior Publication Data

US 2003/0221784 A1 Dec. 4, 2003

Related U.S. Application Data

(60) Provisional application No. 60/385,263, filed on May 31, 2002.

(51) Int. Cl.[7] ................................................ B32B 31/20

(52) U.S. Cl. ....................... 156/361; 156/367; 156/368; 156/378; 156/379; 156/DIG. 45

(58) Field of Search ................................ 156/361, 378, 156/379, 367, 368, DIG. 45, 360, 64, 352

(56) References Cited

U.S. PATENT DOCUMENTS 4,639,287 A * 1/1987 Sakura ....................... 156/361
5,775,918 A 7/1998 Yaanagida et al.

FOREIGN PATENT DOCUMENTS

GB 2157039 A 10/1985
WO 99/46136 9/1999

OTHER PUBLICATIONS

Abstract for JP 07329383, published Dec. 19, 1995.

* cited by examiner

*Primary Examiner*—Melvin C. Mayes
*Assistant Examiner*—George R. Koch, III
(74) *Attorney, Agent, or Firm*—Mark W. Croll, Esq.; Donald J. Breh, Esq.; Welsh & Katz, Ltd.

(57) ABSTRACT

A label applicator of the type for separating labels from a continuous carrier strip and applying the labels to an object positioned at the applicator, which applicator includes a supply roll and a rewind roll configured to move the strip through the applicator, a tamp pad for applying the labels to the object, and an unwind sensor. The unwind sensor includes a supply disk positioned coaxially on the supply roll. The supply disk has a plurality of equally spaced openings therein. A sensor is configured for sensing the passing of the supply disk openings. A counter counts the openings passing the sensor. The applicator includes means for determining a level of labels remaining on the supply roll.

16 Claims, 8 Drawing Sheets

LABEL PRINTER APPLICATOR UNWIND SENSOR

This application claims benefit of 60/385,263 filed May 31, 2002.

BACKGROUND OF THE INVENTION

The present invention relates to a label printer applicator. More particularly, the present invention pertains to a feed roll unwind sensor for a label printer applicator that uses web fed labels and applies those labels to a series of objects.

Automated label printer applicators or label machines are well known in the art. Such a machine feeds a continuous web of label material (which web material includes a carrier or liner and a series of discrete labels adhered to the liner at intervals along the liner), removes the labels from the liner and applies the labels to the objects. In many such machines, the label is also printed by the device, prior to separation from the liner and application to the objects.

Known label machines include, generally, a supply roll on which the web is wound. The web is fed from the supply roll around a plurality of rollers and enters a printing head. In the printing head, indicia are printed on to the individual labels. The web exits the print head and the labels are separated from the liner and are urged into contact with a tamp pad.

The tamp pad is, typically, a vacuum assisted assembly that holds the individual labels and moves the labels into contact with the objects onto which they are adhered. Tamp pads are typically designed to apply a predetermined or desired force upon application of the label to the object. The force used to apply the label can be varied depending upon the object. For example, while a relatively larger force can be used to apply a label to a heavy gauge shipping carton, a much lesser force must be used when applying a label to, for example, a bakery carton.

Subsequent to separating the labels from the liner, the liner is accumulated onto a rewind or take-up roll for subsequent disposal. The driving force for moving the web through the label machine is provided by a motor that drives supply roll while the driving force for collecting the liner is provided by a motor that drives the take-up roll.

Labeling machines are generally part of a high-speed overall processing system. As such, it is desirable to be able to detect various conditions of the supply roll, such as a low label level, few labels remaining or a no labels remaining level. In one known supply roll level sensing arrangement, an optical sensor is mounted adjacent the supply roll. The sensor is mounted so that the point at which a particular, given condition is sensed can be mechanically adjusted, such as by a two-position block or turn screw. A separate sensor in this arrangement is required for label out.

One drawback to this arrangement is that a typical mechanical mounting limits the range to which the settings can be adjusted. As such, it may be found during operation that it is desirable to set a label out or low label condition outside of the permitted range. In addition, many labels use material that has a somewhat reflective nature, and the reflectiveness of the label material can adversely effect the adjustment as well as the sensing capabilities of many such optical sensors.

Another known level sensing arrangement uses a mechanical wheel that rides on the edge of the supply roll. This system provides a continuous sensing, rather than set point sensing conditions, to, for example, indicate low and/or label out conditions. However, in order to accommodate labels having various lengths, the mechanical changes required in the sensing arrangement can be quite difficult to accomplish.

Still another condition sensing device uses an ultrasonic transducer to detect a variety of low and label out conditions. Such ultrasonic devices require considerable and sometimes complex set up times in order to properly calibrate the sensor. Additionally, these sensors typically suffer from performance degradation with changes in temperature and humidity.

In operation of a label machine, it is necessary to properly tension the liner to create optimal peel tension for separating the label from the liner backing. Such tension controls also control the windup or take-up of the waste liner onto the take-up roll.

Known machines utilize a number of different arrangements for creating the proper tension on the liner. In one such arrangement, the rewind roll includes a clutch to allow the motor drive to "slip" once a desired tension is achieved. While such an arrangement works well, the clutch requires initial tension adjustment as well as correction over time as the clutch wears. In that clutches are by nature wear-susceptible components, such clutches must be replaced during the course of operation of the machine. Typically, clutch replacement is a fairly labor-intensive undertaking and requires that the machine be taken out of service for an extended period of time.

In addition, a clutch can be set at a single fixed tension value. However, in order for the liner tension to remain constant as the roll size grows or shrinks, the clutch tension must be changed with a change in the roll diameter.

Another known arrangement for creating proper tension uses a dancer arm with a limit switch. In such an arrangement, the rewind motor is controlled to operate when the arm moves away from a set point, which set point is determined by a spring tension. In such an arrangement, the motor is either on or off with the position of the limit switch. Typical motors are AC induction-type motors.

One drawback to this arrangement is that "spikes" in the tension of the liner are observed when the motor turns on or off. In that the motor is either on and running at a particular speed, or off, it has been found that as the motor accelerates and tension increases, the desired tension set point is overshot. This can result in tension spikes which can cause the liner to break and/or print "stretching".

Also in known machines, in applying the label to the product or object surface, it is desirable to apply the label at a consistent force without taking into account changes in the product surface distance, reflectivity or tamp pressure. As set forth above, the label is separated from the liner and is held on the tamp pad. The label remains on the pad until the target object is in line with the pad. A tamp cylinder then extends to move the tamp pad into contact the object surface to apply the label to the surface. At the completion of the extension stroke, the cylinder returns the pad to the home or rest position at which time a subsequent label can be fed onto the tamp pad.

It is desirable to transfer the label and apply the label to the product surface at a relatively high rate of speed. As such, the transfer process inherently controls the throughput of the label machine. A number of methods are known for controlling the application of the label to the product or object surface in order to maintain high rates of throughput. One straightforward method uses a timer (through hard wiring, such as relays or through software), to return the cylinder from the extended position to the home position based upon a predetermined duration of time. While this method and arrangement is relatively straightforward, it does not compensate for varying product distance. As such, the tamp pad may not reach a shorter product, or conversely, the force may be too great for applying a label to a larger object, in which instance the force of the tamp pad could deform the product or jam the cylinder.

Another tamp pad control arrangement uses optical sensors that sense the product as the tamp cylinder is extending. Difficulties have been encountered with these optical sensors when used in connection with products having non-reflective or other than flat surfaces. In addition, because of the wiring and/or circuitry required on the moving tamp pad, mean time between failures has been shown to decrease, thus requiring maintenance and/or repair more frequently than acceptable.

Still another arrangement uses contact plates or mechanical pressure switches to sense pressure. In such an arrangement, the cylinder is returned from the extended position to the home position without a time delay, based upon a sensed pressure. These arrangements measure the pressure within the cylinder chamber and reverse direction of the cylinder upon reaching a set, high pressure point.

Typically, in these arrangements, the contact plates require a fairly significant force to perform the switch-over function, that is to sense the increased pressure in the cylinder and reverse the cylinder direction. In addition, these mechanical components add significant weight to the tamp pad which increases the time required to change direction. These arrangements typically result in a high force of application on the product surface. As with the other arrangements, this arrangement often requires operator adjustment and frequent maintenance in order to maintain the equipment in proper operating condition.

The tamp pads are configured such that a label is transferred onto the pad after it is separated from the liner with the non-adhesive side of the label contacting an impact plate (on the front side of the pad). The label is held on the plate and the tamp pad is extended toward the product surface for application of the label. In a typical arrangement, a vacuum is used to secure the label to the impact plate. Typical impact pads are formed from a low friction material having a plurality of vacuum openings formed therein. Vacuum channels are formed in the rear of the plate.

The plate is mounted to a mounting plate (the rear of the tamp pad) through which a vacuum port provides communication from a vacuum source to the rear of the impact plate. A vacuum is drawn through the vacuum openings to secure the label to the impact plate after separation from the liner and prior to application to the object surface.

Desirably, label machines are configured for accepting and applying a wide variety of label sizes. To this end, tamp pads must be configured for each of the different label sizes that may be used in a particular machine. The pads must be changed out each time the label size is changed. It has been found that use of improper pad sizes can adversely effect operation of the machine. For example, if a label is smaller than the area encompassed by the vacuum openings, the vacuum will tend to draw through those openings surrounding the label. As such, the label may not be properly secured to the tamp pad. As a result, the label can tend to slip from the pad or be misapplied to the object.

To this end, label machines are often supplied with a variety of different tamp pad sizes to accommodate label of different sizes. This increases costs as well as the time necessary for machine set up. Other arrangements use standard backing plates or mounts, but use a variety of rubber or similar material faceplates that can be punched out for the particular label dimensions. This, again, lacks the ability to reconfigure face pads that have been punched for a desired application.

Accordingly, there exists a need for an improved label printer applicator that provides a ready count or indication of the one or more desired levels of labels remaining on the supply roll. Desirably, such indication can be easily changed, and can further be used to control operation of the machine. Such a printer applicator also includes an assembly to control the movement and timing of the tamp pad with respect to applying labels to the surface of objects. Desirably, such an assembly permits applying labels to objects having varying heights or distances from the tamp pad home position, while taking into consideration the force at which the label is applied. Most desirably, such an assembly is self calibrating to take such height differences as well as changes in compressed air supply into account in applying the labels.

In such a machine, the tamp pad is configured to permit the use of different sizes of labels without the need to change-out pads for each label size. Such a machine also uses a novel rewind assembly and drive to provide proper tension on the liner to prevent over tensioning (and possible breakage), while providing sufficient tension to peel the labels away from the liner on which they are carried.

BRIEF SUMMARY OF THE INVENTION

A label applicator of the type for separating labels from a continuous carrier strip and applying the labels to an object positioned at the applicator includes a supply roll and a rewind roll. The supply and rewind rolls are driven by motors for moving the strip through the applicator.

The applicator includes a supply disk positioned coaxially on the supply roll. The supply disk has a plurality of equally spaced openings therein. A sensor senses the passing of the supply disk openings. A counter counts the openings passing the sensor. The applicator includes means for determining a level of labels remaining on the supply roll by counting the openings. In a preferred applicator, the means for determining the level of labels includes a controller. The level of labels is determined by $R=[(L_L)(T)]/[2\pi(T_{acc})]$, where R is a radius of supply roll, $L_L$ is a length of the label, T is the number of spaced openings in one revolution of the supply disk and $T_{acc}$ is the number of spaced openings counted when a label was printed.

In the preferred applicator, the sensor is an optical sensor. The supply disk can be mounted to a supply roll hub. The supply disk can be mounted at a rear of the supply roll and the sensor can be mounted overlying a periphery of the supply disk at the supply disk openings. In this manner, the supply disk is located so as to minimize interference or damage.

The applicator includes a tamp pad assembly for moving the labels into contact with an object at the applicator. The assembly includes a tamp pad cylinder having a compressed gas inlet for extending the cylinder and a compressed gas inlet for retracting the cylinder. A pressure transducer is mounted in communication with the compressed gas extension inlet for measuring a pressure in the cylinder. The tamp pad assembly includes means for controlling movement of the cylinder between an extended position and a retracted position including input means from the pressure transducer.

A tamp pad has a plurality of vacuum openings formed therein. The vacuum openings are arranged in at least two series of openings. Each of the openings in a series is aligned with one another. The openings of each series are spaced from the openings of each other series.

The tamp pad has a vacuum channel formed in a side thereof and at least two depending sub-channels in communication with the vacuum channel. The vacuum sub-channels are configured for receipt of a blocking element to prevent communication of a vacuum through a selected one of the series of openings.

The improved applicator includes a rewind assembly having a motor, a biased pivoting arm and a sensing assembly cooperating with the pivoting arm. The sensing assembly senses the presence or absence of a sensed element as the pivoting arm moves from a first home position to a position other than the home position. The sensor is operably connected to the rewind roll drive so as to actuate the motor upon moving the arm toward the home position.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
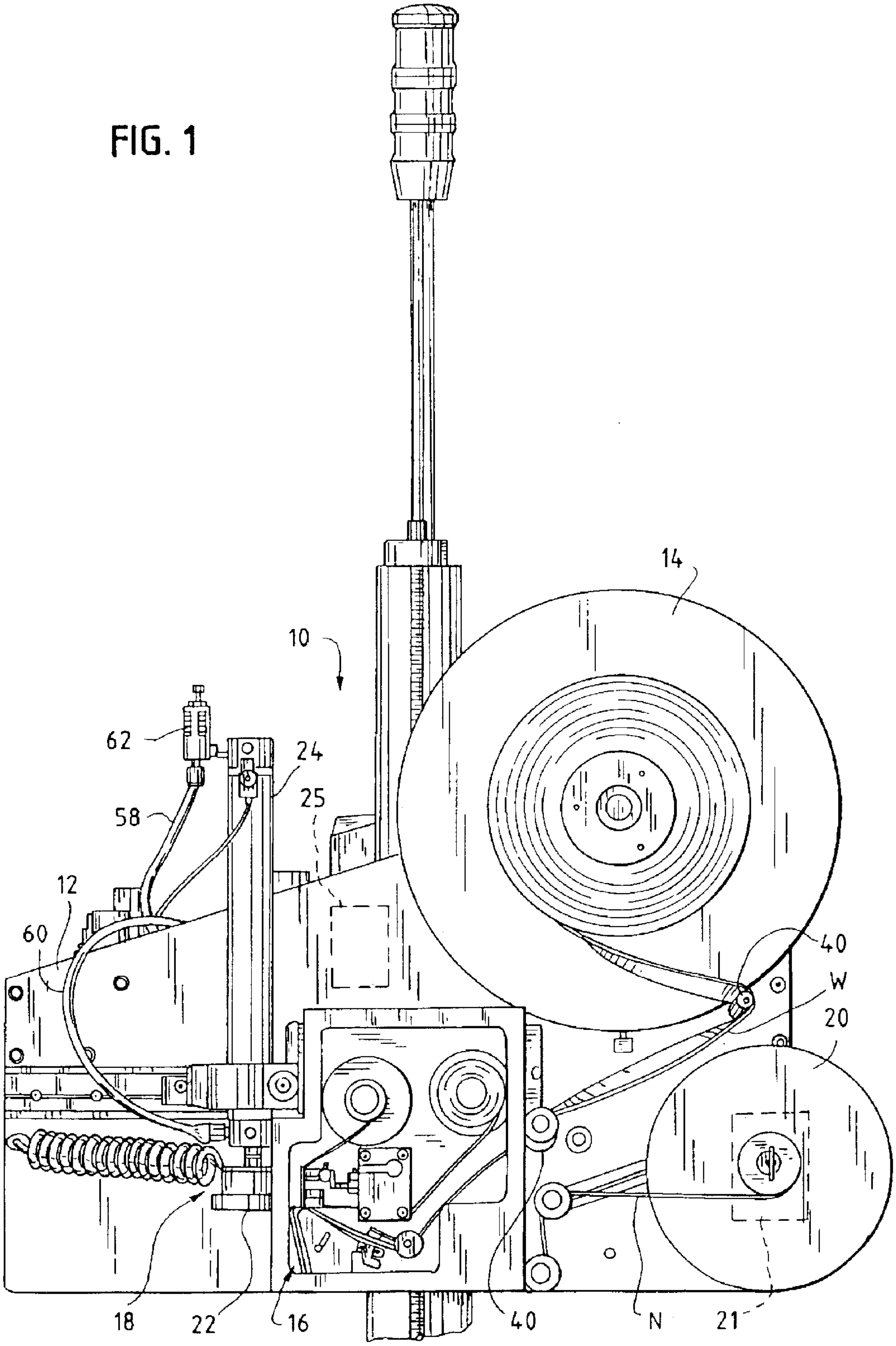
FIG. 1 is a front view of a label printer applicator embodying the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, “Detailed Description Of The Invention”, relates to a requirement of the United States Patent Office, and does not imply, nor should be inferred to limit the subject matter disclosed herein.

Referring now to the figures and in particular, to FIG. 1 there is shown generally an automatic label printer applicator or label machine 10. The machine 10 includes a frame or stand 12 and is positioned above objects (not shown) onto which labels L (see, e.g., FIG. 11) are placed. The frame 12 has mounted thereto a supply or unwind roll 14, a print head 16, a tamp pad assembly 18 and a take-up or rewind roll 20.

A web indicated generally at W (which includes a backing or liner strip N on which discrete labels L are adhered) is fed from the supply roll 14 and traverses through the print head 16, in which indicia are printed on the individual labels L. The labels L are then separated from the web W and are dispensed to a tamp pad 22. A tamp pad cylinder 24 (having the tamp pad 22 mounted thereto) extends to apply the label L to the surface of the object. The liner N, after the labels L have been removed, is then wound onto the take-up or rewind roll 20. The operation of the label machine 10 is controlled by a controller 25 mounted local to (or on) the machine 10.

Figure 3:
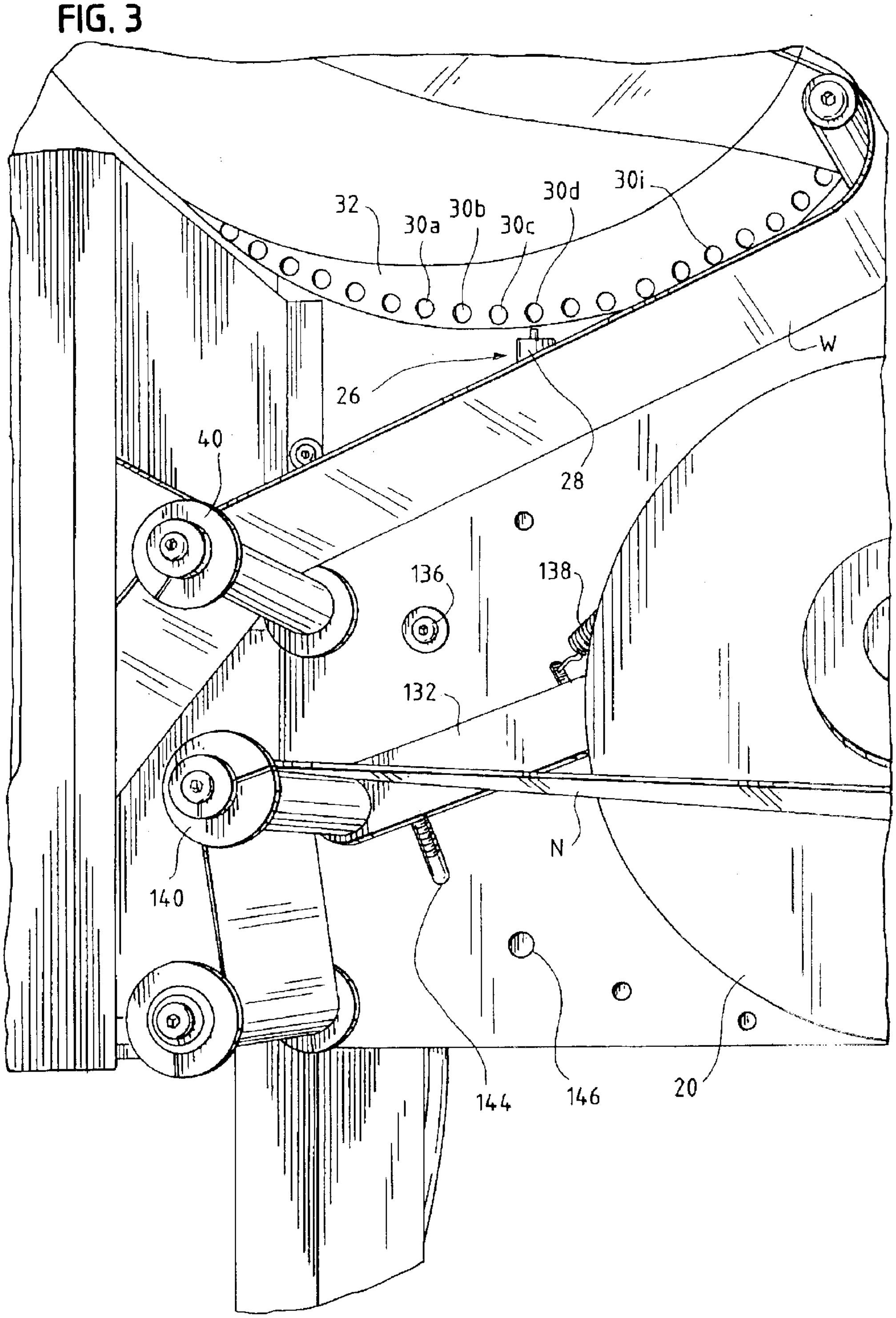
FIG. 3 is an enlarged illustration of the rewind assembly dancer arm and the rewind tension sensor assembly.
Figure 6:
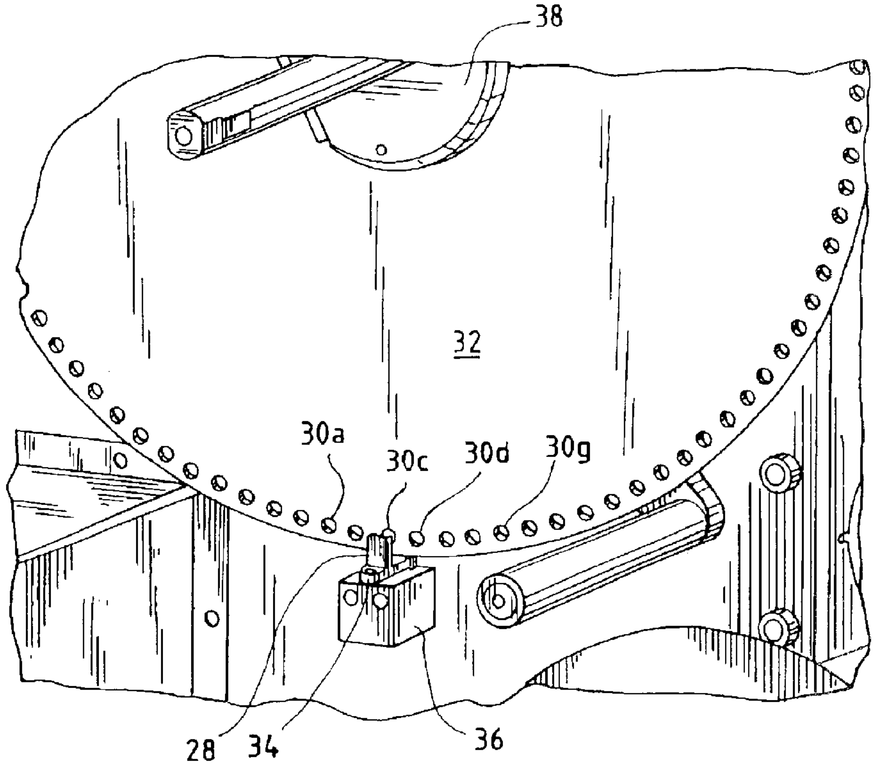
FIG. 6 is a graphic illustration of the supply roll encoder disk and sensor.

In order to monitor the “level” of labels L remaining on the supply roll 14, the machine 10 includes a supply roll level sensing assembly 26. Referring to FIGS. 3 and 6, the sensing assembly 26 includes an optical slot sensor 28 and a series of slots or holes or openings 30*a,b,c* . . . formed in the supply roll disk 32. In a present arrangement, the holes are formed in the supply roll inner disk 32, beyond the periphery of the web W wound on the roll 14. The assembly 26 is configured to monitor the level or quantity of labels L on the supply roll 14 and to generate signals (for indication) corresponding to a label low supply, label out and “early out”. In the present assembly 26, a single sensor 28 can be used to provide these three indicating functions. That is, the level sensing assembly 26 includes means for identifying discrete portions of rotational movement of the supply disk 32, means for counting movement of the discrete portions and means for determining a level of labels remaining on the supply roll 32.

The assembly 26 utilizes the sensor 28 and holes 30*a,b,c* . . . formed in the supply roll disk 32 in an encoder arrangement. In printing or advancing a label, the number of holes 30*a,b,c* . . . moving passed the sensor 28 is counted. As the label L is fed from the machine 10, the accumulated count, in conjunction with the label length, is maintained in memory in the controller 25. The controller 25 calculates the diameter (radius) of the remaining label roll by use of the equation below:

$$R=[(L_L)(T)]/[2\,\pi(T_{acc})]$$

Where:

R=roll radius;

$L_L$=the distance in inches of the label length;

T=the number of transitions or holes counted in one revolution of the supply disk; and $T_{acc}$ is the number of transitions counted when a label was printed.

As the machine 10 begins printing a label L, the supply roll 14 (and thus the disk 32) rotates. As the disk 32 turns, the sensor 28 counts the number of transitions or slots 30*a,b,c* . . . If the supply roll 14 does not rotate, the system enters the "early out" condition. In this condition, the machine 10 is allowed to run down to the last few labels L without transporting the end of the liner N (which includes an adhesive bonding material to secure the liner N to the core) through the printer 16. As will be recognized by those skilled in the art, it is undesirable to transport this portion of the liner N through the print head 16 as damage and/or premature wearing of the print head 16 may occur. Once the supply roll 14 remains stationary for a predetermined period (during which a preset number of labels L is printed), the machine 10 enters "label out" status and shuts down.

It has been found that a number of advantages are achieved using the present sensor assembly 26 arrangement. First, variable set positions for the supply roll 14 level can be established within the controller 25 merely by setting a predetermined supply roll 14 "radius". For example, with a proper operator interface, set point positions or conditions can be established and "set" through operator accessible screens and the like. This permits the controller 25 to maintain the particular label and/or operating information within memory for ready recall and reprinting of like labels. In addition, the controller 25 can be configured to allow password only access to the set points within the control system.

Advantageously, the present sensor arrangement 26 uses a sensor 28 that does not require calibration. That is, the light sensor 28 and "holes" 30*a,b,c* . . . within the disk 32 are set upon installation. No changes in the position of the sensor 28 relative to the holes 30*a,b,c* . . . are required. As such, no field required changes or adjustments are necessary. In addition, such an arrangement is essentially impervious to environmental changes. That is, changes in humidity and/or temperature in the workplace environment have little to no impact on the overall operation of the sensor assembly 26 arrangement.

As will be appreciated by those skilled in the art, no mechanical adjustments are required for setup. A senor block 34 is mounted to a base plate 36 and the encoder or supply roll disk 32 is permanently attached to a supply roll hub 38. As such, once established at a fabrication plant, the machine 10 can essentially be installed and started up without adjustment or calibration.

Figure 4:
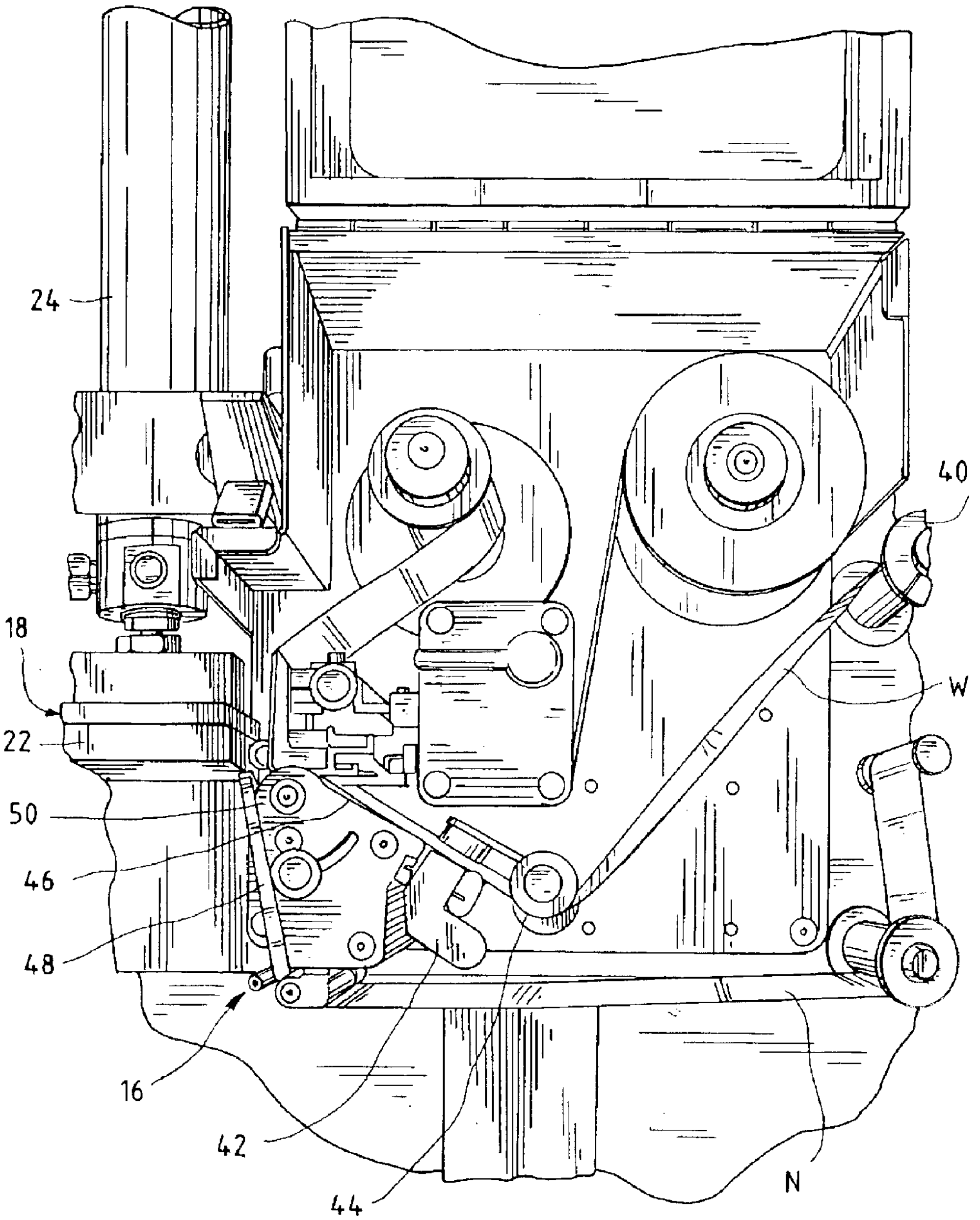
FIG. 4 is an illustration of the print head and shows the path of the web, labels and liner through the printer applicator.
Figure 5:
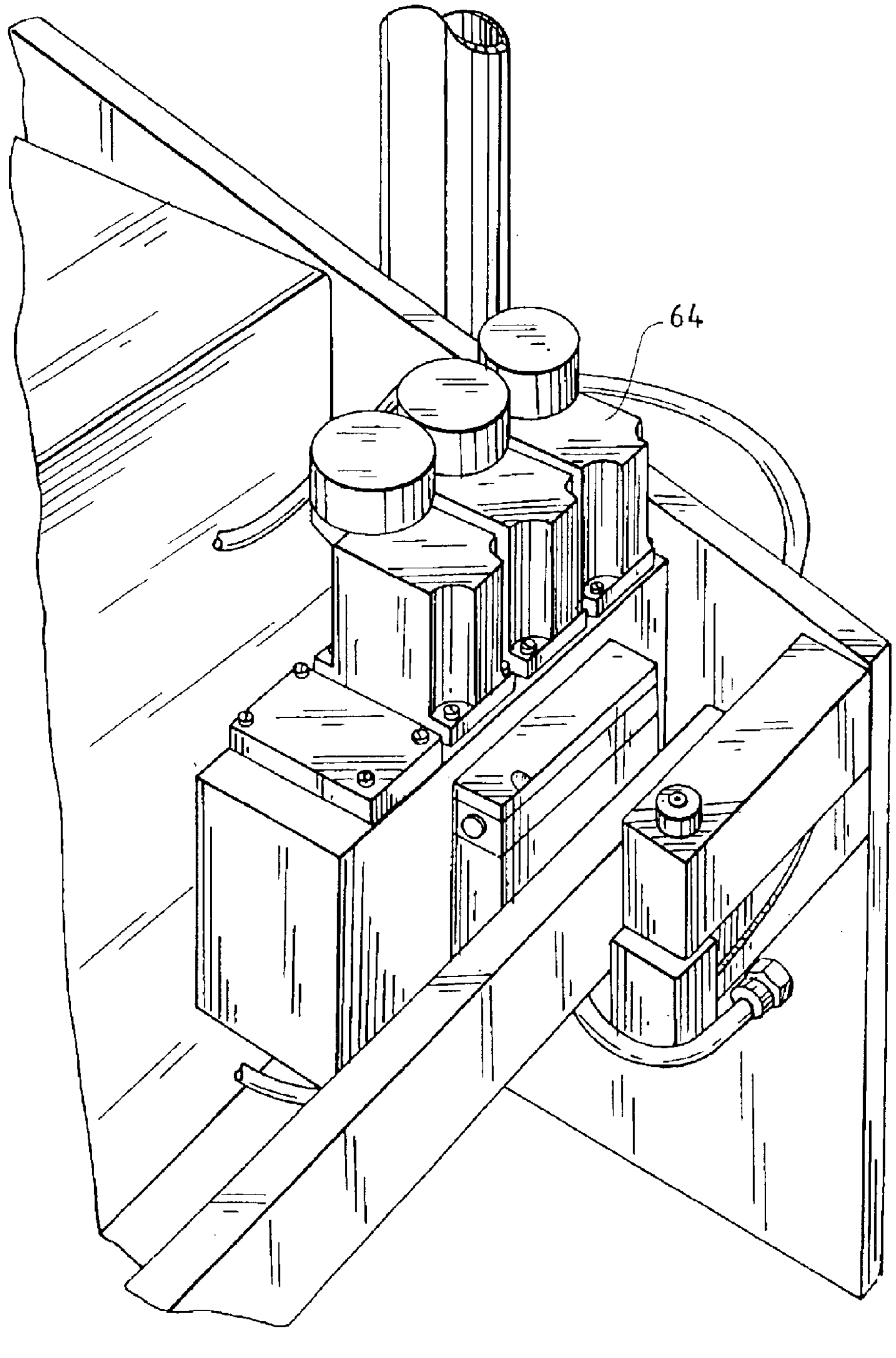
FIG. 5 is an illustration of the rear of the printer applicator showing various compressed air valves (solenoid valves) for controlling the pneumatic portion of the machine.

Referring to FIGS. 1 and 4, and continuing through the machine 10, the web W traverses from the supply roll 14 over one or more guide rollers 40 and enters the print head 16. As seen in FIG. 4, in the print head 16, the web W is aligned by one or more guides 42 or rollers 44 and passes through the printer 46. Indicia are printed on the label L in accordance with known methods, using known printing techniques. For example, indicia can be imprinted on the label L by transfer from a print ribbon. Alternately, those skilled in the art will recognize the various types of contact and non-contact print devices that can be used.

Figure 2:
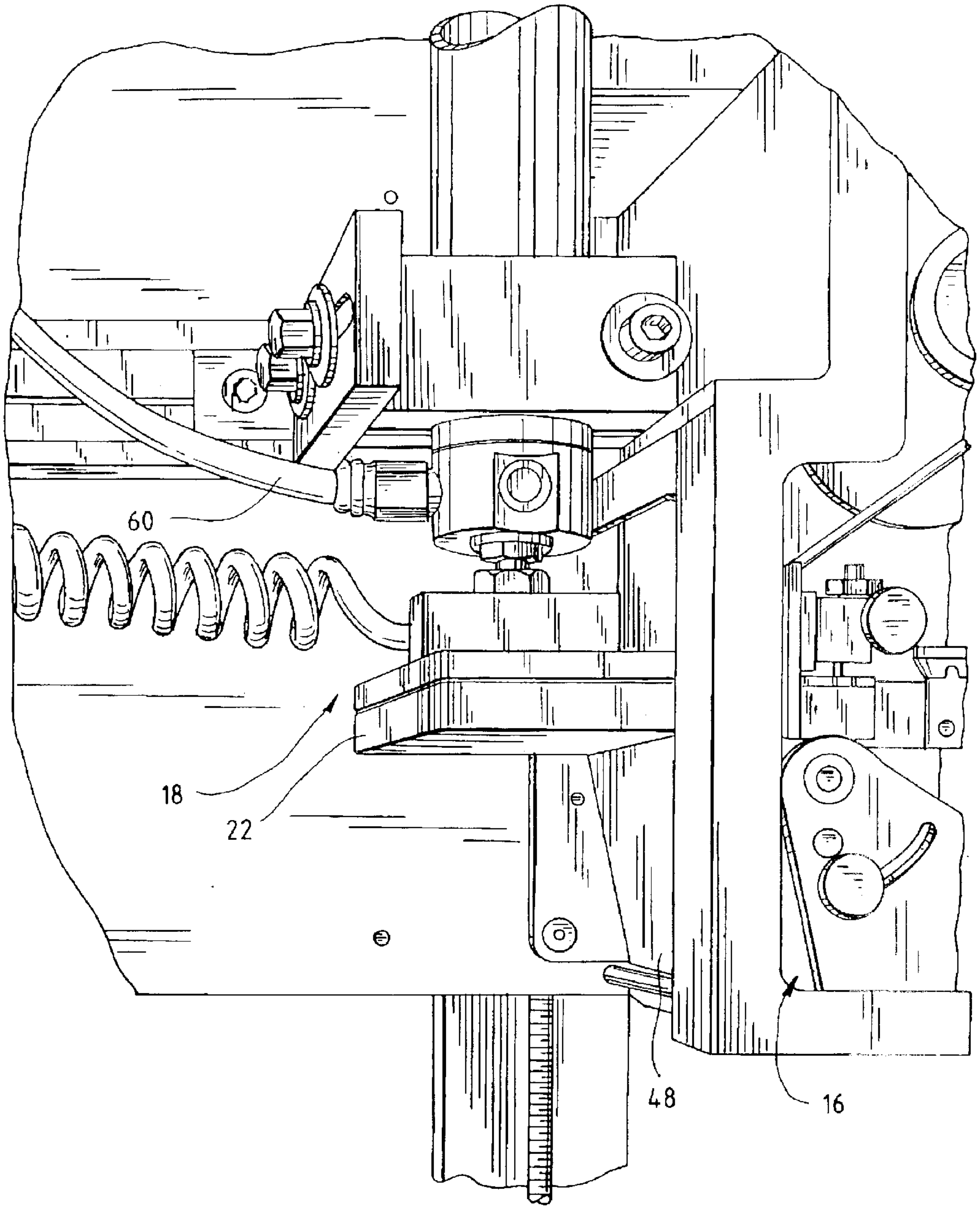
FIG. 2 is an enlarged illustration of the tamp pad assembly of the printer applicator showing the separation blade and tamp pad.

Referring to FIGS. 2 and 4, after exiting the printer 16, the web W traverses to a separating blade 48. At the separating blade 48, the web W is rerouted (i.e., in a sharp angled turn, as indicated generally at 50) to begin separating the label L from the liner N. The liner N then traverses in a direction opposite that of the continued movement of the label L. Essentially, the liner N is pulled away from the label L, and the label L traverses on to the tamp pad 22.

Figure 7:
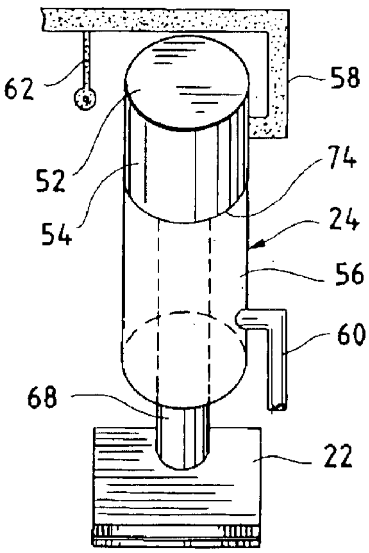
FIG. 7 is a graphic illustration of the tamp pad cylinder assembly and air supply arrangement.

Referring now to FIGS. 1–2 and 7, the tamp pad 22 is part of the overall tamp assembly 18. The tamp assembly 18 includes generally the tamp pad 22 and the tamp pad cylinder 24. In a present embodiment, the cylinder 24 is a pneumatic cylinder. The tamp pad 22 (which will be discussed in detail below) is mounted to the cylinder 24 and moves with extension and retraction of the cylinder 24 between the label L applying or extended position and a label L receiving or home position (FIG. 2). These positions are the positions at which the label L is applied to the product surface and the position at which the label L is moved onto the tamp pad 22 after separation from the liner N.

In a present arrangement, a dual action cylinder 24 is used. That is, air (or a like compressed gas) pressure is applied to one side 52 of a piston 54 in the cylinder 24 to extend the cylinder 24 and air pressure is applied to an opposing side 56 of the piston 54 to retract the cylinder 24. Compressed air supply lines 58, 60 extend from a compressed air source (not shown) to inlets at the opposing sides 52, 56 of the cylinder 24 to move the cylinder 24 between the extended and home positions.

In a current embodiment of the label machine 10, a pressure transducer 62 is positioned in the supply line 58 to the piston 54 for supplying air to move the piston 54 to the extended (label L applying) position. The transducer 62, in conjunction with the controller 25 is used to monitor the varying pressure in the cylinder 24 body. The system is configured to recalibrate during each extension cycle to maintain an optimal threshold level. In this manner, changes in pressure from the pressure source or changes in the tamp cylinder 24 pressure set point are taken into consideration during each recalibration cycle. Moreover cylinder 24 body wear and debris within the orifices (not shown) are likewise compensated for by measuring the pressure profile of the air filling the cylinder 24.

Figure 8:
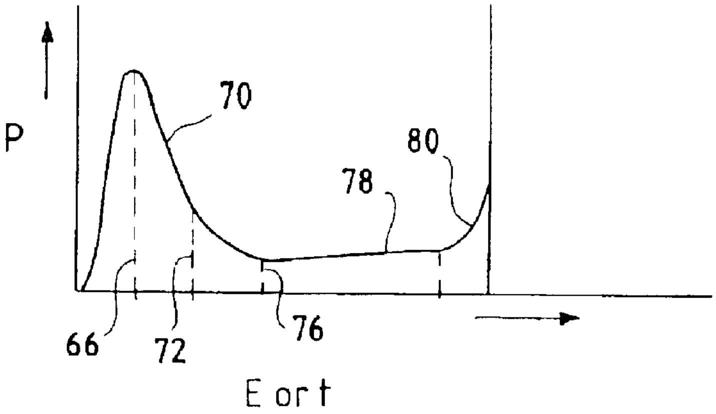
FIG. 8 is a plot of the pressure as measured by the pressure transducer along the ordinate (y-axis) of the plot and time/extension of the cylinder shown along the abscissa (x-axis) of the plot.

FIG. 8 graphically illustrates one cycle of the piston 54 from the retracted position through the extended position. This figure is a plot of the pressure P as measured by the pressure transducer 62 along the ordinate of the plot (y-axis) and time (t) or extension (E) shown along the abscissa of the plot (x-axis).

Upon receipt of a signal from the controller 25 to apply a label L, a valve 64 is opened to apply pressure to the extension inlet port side 52 of the cylinder 24, and the tamp pad 22 moves to the extended position. At this point in time, the cylinder 24 volume is small and the initial pressure inlet peaks (as indicated at 66). The pressure initially spikes in that the cylinder 24 must be moved from the home position. As such, the rate of change of volume is less than the rate of change of pressure within the cylinder 24. The peak pressure (as at 66) measured by the transducer 62 is used to determine a maximum pressure or tamp pressure value setting for the system 10.

As the cylinder rod 68 begins to move at an increased rate (in that the initial inertia of the system is overcome), the pressure begins to drop (as indicated at 70) within the cylinder 24. It has been found that the pressure drops to a level (as indicated at 72) that is equal to the rate of volume expansion or rate of air filling the space behind the rod plate 74. The transducer 62 monitors and measures the lowest point of pressure (as indicated at 76) for the system and provides a signal to the controller 25 for determining the optimal trigger threshold point for return.

The cylinder 24 continues to extend as the pressure slowly begins to increase (as indicated at 78). This is due to the velocity of the cylinder 24 reaching an essentially steady state, while air continues to be fed into the cylinder 24. Although the pressure increases, the increase is significantly small so as to not cause a triggering of the cylinder return.

Once the tamp pad 22 contacts the product surface, there is an abrupt increase or positive change in pressure (as indicated at 80) in the cylinder 24. Because the volume of the cylinder 24 is fixed, it can no longer extend further. As a result, the pressure in the cylinder 24 increases beyond the trip point established by the proceeding events. Upon reaching this point, the cylinder 24 is retracted to the home position by inlet of the retraction air (through piston side 56), and the venting of the extension side 52 of the cylinder 24.

The present arrangement has a number of advantages over known tamp pad pressure return arrangements. First, a relatively inexpensive "off the shelf" pressure transducer 62 is used to monitor the pressure in the cylinder 24. The transducer 62 generates signals that are used to provide input for automatic control and calibration of the tamp process. In addition, the process calibrates each cycle. In this manner, close control is maintained over the tamp process.

Moreover, the contact force, that is the force of the tamp pad 22 on the object surface is consistent regardless of fluctuations in inlet 58 pressure and user set point adjustments. In addition, as set forth above, the force is established regardless of environmental conditions (e.g., temperature and humidity fluctuations).

Also, unlike many known tamp sensing arrangements, varying product distances can be accommodated by the present pressure sensing arrangement. That is, packages of different "heights" can have labels applied thereto using the present label machine 10, because the point from which the tamp pad 22 returns is determined by sensing the pressure spike and trough and setting the return pressure accordingly.

Moreover, it has been found that the use of a pressure transducer 62 in the inlet line 58 does not adversely affect the throughput of the label machine 10. That is, even though the transducer 62 may not react instantly, it has been found that the sensitivity of the transducer 62 does not adversely affect the speed of the packaging line.

Figure 10:
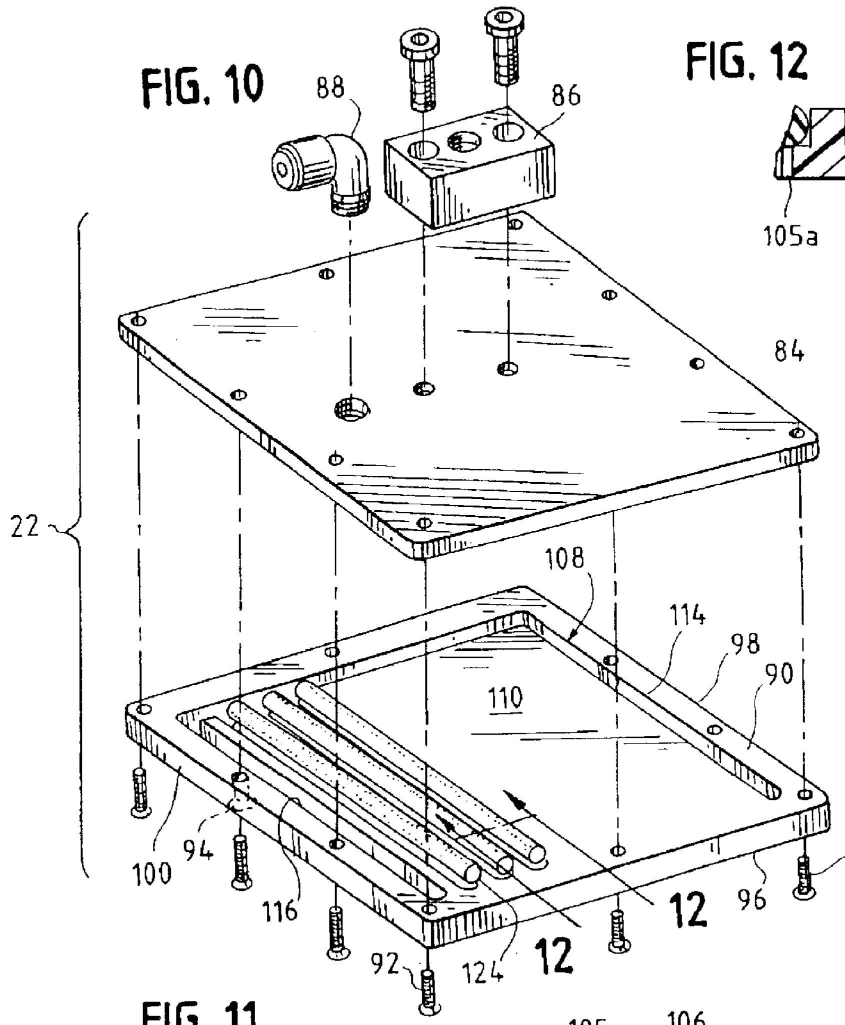
FIG. 10 is an exploded view of a tamp pad embodying the principles of the present invention.
Figure 12:
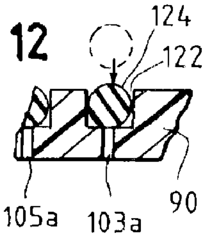
FIG. 12 is a cross-sectional view taken along line 12—12 of FIG. 10, showing the blocking strips positioned in the tamp pad vacuum sub-channels.
Figure 11:
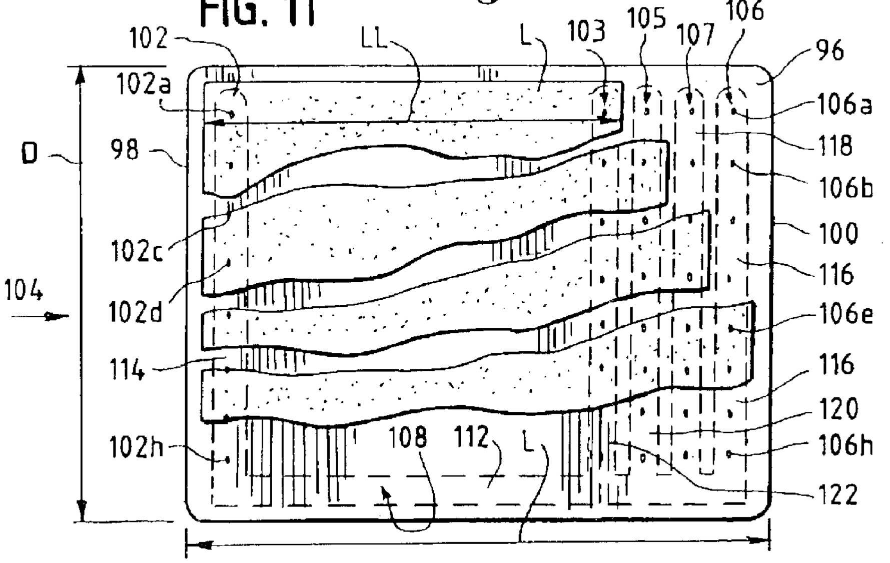
FIG. 11 is a front view of the tamp pad of FIG. 10 showing the vacuum openings and the vacuum channels and sub-channels in phantom lines, and showing, in partial views, various sizes of labels positioned on the pad.

With respect to the tamp pad 22, a pad in accordance with the present invention is illustrated in FIGS. 10–12. The tamp pad 22 is configured to allow changing label sizes quickly and to allow use of a single pad with multiple size labels. The tamp pad 22 includes a rear mounting plate 84 having a mounting block 86 attached thereto. A vacuum inlet 88, such as the illustrated vacuum elbow fitting is mounted to the rear mount plate 84.

An impact plate 90 is mounted to the rear mounting plate 84. The impact plate 90 is that plate onto which the label L is transferred and is carried to the object surface for adhering to the object. The impact plate 90 is mounted to the rear mounting plate 84 by a plurality of fasteners 92, such as the illustrated flat head machine screws. The impact plate 90 is configured having counter-bored openings (as shown at 94) so that the screws 92 rest flush or below the surface 96 of the impact plate 90.

The impact plate 90 includes a first or leading end 98 (which is that end closest to the print head 16) and a trailing end 100 (which is that end farthest from the print head 16). A plurality of vacuum openings or through holes 102*a,b,c* . . . are formed in the impact plate 90 at the leading end 98 (the leading end series of openings). The series of openings 102 extend along the width D of the plate 90 or in the direction transverse to the direction (indicated by the arrow at 104) in which the labels L move on to the plate 90.

The trailing end 100 of the plate 90 includes a plurality of series of openings 106*a,b,c* . . . Each of the series of openings 106 extends generally parallel to the leading end series of openings 102. These openings 106, like the leading end openings 102, are transverse to the direction 104 of movement of the label L on to the pad 90. It is through these openings 102, 106 that vacuum is communicated to secure the non-adhesive side of the label L to the tamp pad 90 from the time that it is separated from the liner N until it is applied to the product or object surface. Intermediate series of openings such as those indicated at 103, 105, 107 can also be formed in the pad 22.

The impact plate 90 includes a vacuum channel 108 formed in a rear surface 10 thereof. The vacuum channel 108 includes a main longitudinal channel 112 that is in communication with the vacuum inlet 88 on the mounting plate 90. The longitudinal channel 112 extends essentially along the length L of the plate 90 from the leading end vacuum openings 102 to the trailing end vacuum openings 106. There are no vacuum openings formed in the main longitudinal channel 112.

The leading and trailing end vacuum opening series 102, 106 are in communication with sub-channels 114, 116, respectively, that extend from the main vacuum channel 112. Each sub-channel 114, 116 essentially depends from the main vacuum channel 112. A single series of vacuum openings (e.g., 102*a,b,c* . . . ) is formed so as to communicate with a discrete sub-channel (e.g., 114). In this manner, the leading edge vacuum openings 102 are formed in a first sub-channel 114 and each series of trailing edge vacuum openings (103, 105, 107 and 106) is formed in a discrete trailing edge vacuum sub-channel (118, 120, 122 and 116, respectively).

As will be recognized by those skilled in the art, when the vacuum openings 102, 103, 105, 106, 107 extend over an area that is greater than the size of the label L that is secured thereto, the vacuum tends to be drawn through the openings over which a portion of the label L does not lie. That is, the vacuum tends to be drawn through the path of least resistance which is those vacuum openings that are open to atmosphere, rather than those over which the label L lies.

To this end, a present tamp pad 22 includes a plurality of blocking strips 124 that can be laid in each of the sub-channels 116–122 along the entire length of the sub-channel 116–122 or a portion of the sub-channel 116–122. The strips 124 are configured so as to block or prevent communication of the vacuum from the main channel 112 into those vacuum openings lying along the blocked sub-channel. In this manner, a desired series of openings and/or portions of series of openings can be configured to remain open while other series and/or portions of series of openings can be blocked. In a present pad, the strips 124 are formed from a silicone rubber that is readily placed and held in a desired sub-channel 116–122.

This arrangement provides for free communication of the vacuum through those openings that correspond to a given label size. Thus, if a small label is to be used with the tamp pad 22, the impact plate 90 can be removed, strips 124 can be laid in the sub-channels that are outside of the label footprint (e.g., 116–120 as appropriate) and the impact plate 90 can be remounted to the mounting plate 84. Thus, when a vacuum is drawn through the vacuum inlet 88 in the mounting block 86, the vacuum is communicated only to those vacuum openings that correspond to a desired, particular label. This configuration permits reconfiguring a single tamp pad 22 for use with a variety of sizes of labels L by reconfiguring the layout of the blocking strips 124.

It has been found that a tamp pad 22 in accordance with the present invention permits the use of a variety of label sizes with a single tamp pad 22. For example, as noted below, tamp pads 22 having the dimensions as shown in the first column can be used with labels L ranging from about the size shown in the second column (smallest label L size) to a label L size about as large as that shown in the third column (largest label L size).

| PAD SIZE | APPROXIMATE SMALLEST LABEL SIZE | APPROXIMATE LARGEST LABEL SIZE |
|---|---|---|
| 2" × 2" pad | 1" × 1" | 2" × 2" |
| 2" × 4" pad | 1" × 2.5" | 2" × 4" |
| 2" × 6" pad | 1" × 4.5" | 2" × 6" |
| 2" × 8" pad | 1" × 6.5" | 2" × 8" |
| 2" × 13" pad | 1" × 8.5" | 2" × 13" |
| 4" × 2" pad | 2.5" × 1" | 4" × 2" |
| 4" × 4" pad | 2.5" × 2.5" | 4" × 4" |
| 4" × 6" pad | 2.5" × 4.5" | 4" × 6" |
| 4" × 8" pad | 2.5" × 6.5" | 4" × 8" |
| 4" × 13" pad | 2.5" × 8.5" | 4" × 13" |

The tamp pad 22 is configured so that the blocking strips 124 are readily removed and/or replaced in the sub-channels 116–122. To reconfigure the tamp pad 22, the fasteners 92 or mounting screws that secure the impact plate 90 to the mounting plate 84 are removed. The strips 124 can then be inserted or removed in those sub-channels 116–122 or portions of sub-channels 114–122 that require blocking off for the particular label L size. At least a portion of the first sub-channel 114 always remains unblocked. However, if a label L width D is smaller than the maximum that can be accommodated for that particular pad 22, a portion of the sub-channel 114 can be blocked. In addition, it has been found that the channel utilized for the particular label's furthest length edge should also remain unblocked.

It has been found that present configuration permits reducing the number of tamp pad combinations significantly. For example, in a present application, it has been found that the number of tamp pad combinations can be reduced from over 900 to about 10. The present configuration also permits an end user to use the same pad 22 even if their label L size changes within a preset range. In addition, the user (customer) can readily reconfigure the tamp pad 22 with minimal downtime and without significant skilled labor.

Figure 9:
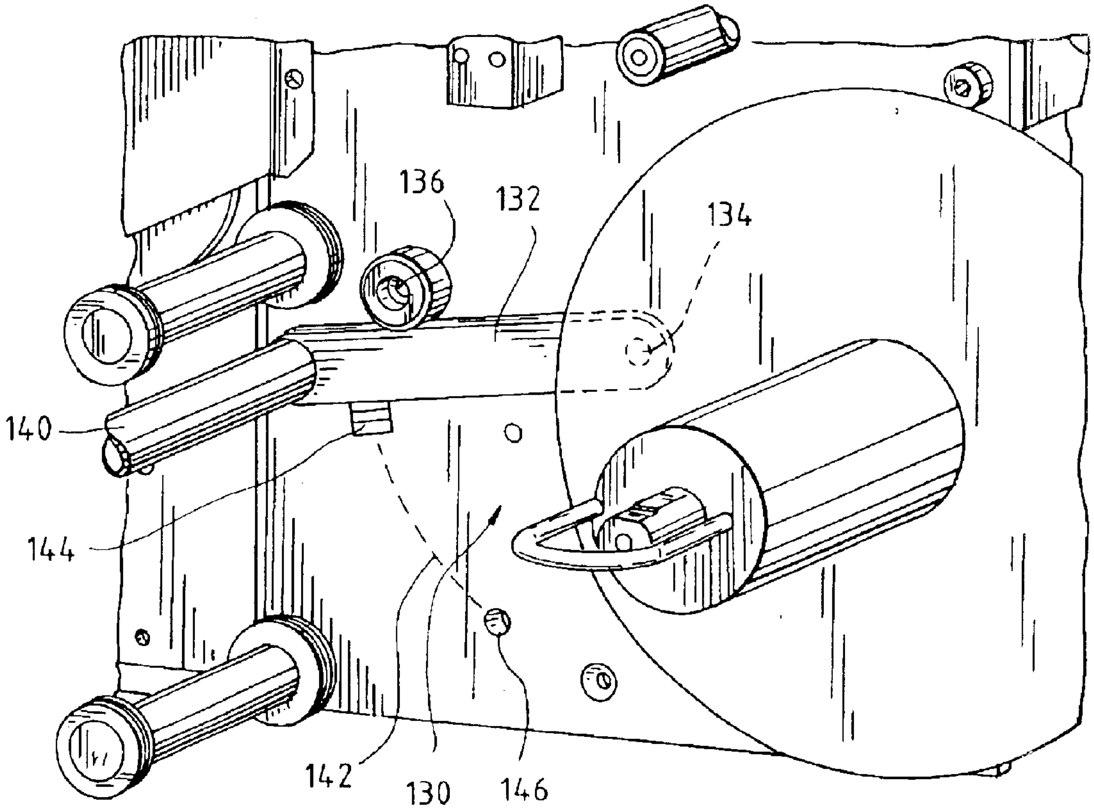
FIG. 9 is a further illustration of the rewind assembly dancer arm and the rewind tension sensor assembly, as shown in FIG. 3.

Still another advantage of the present label machine relates to the rewind or take-up arrangement indicated generally at 130. The rewind arrangement 130, best seen in FIGS. 3 and 9, is configured to facilitate creating sufficient tension for separating the label L from the liner N as well as to control the wind up of the waste liner N onto the rewind roll 20. To this end, the rewind arrangement 130 includes the rewind roll 20 onto which the waste liner N is rolled. The roll 20 is driven by a motor 21 that is controlled by the overall machine controller 25. In a present machine, a servomotor or stepper motor is used for the rewind assembly 130 to provide greater control over the rewind speed as discussed below.

A present rewind assembly 130 includes a pivoting dancer arm 132 that controls the rewind tension and speed while at the same time reduces slack that may develop in the web W when the label feed begins and the rewind motor 21 starts. To this end, the rewind assembly 130 creates sufficient tension on the liner N to avoid telescoping of the liner waste roll 20 while at the same time creating sufficient (but not too much) tension in the liner N to prevent label L mis-feed and print stretching.

As shown in FIG. 9, the dancer arm 132 is mounted for pivoting about a pivot 134 located near the rewind roll 20. The dancer arm 132 cooperates with an upper stop 136 and is biased toward the upper stop 136 position. In a present arrangement, a constant rate spring 138 (FIG. 3) biases the dancer arm 132 to the stop position. A roller 140 is positioned at about an end of the dancer arm 132, over which roller 140 the liner N travels.

A sensing assembly 142 cooperates with the dancer arm 132. In a present arrangement, the sensing assembly 142 includes magnets 144 positioned on the arm 132 between the pivot 134 and the roller 140 and a magnet sensor 146 mounted to the label machine frame 12.

The dancer arm spring 138 is a fixed rate spring and thus sets the tension in the liner N in a non-linear fashion. In addition, as set forth above, the rewind roll 20 is controlled by a stepper or servomotor rather than a conventional induction motor. As such, movement of the rewind roll 20 is more closely controlled than would otherwise be possible with a convention induction motor.

As will be appreciated by those skilled in the art, liner N tension increases as the rewind motor 21 turns. This in turn forces the dancer arm 132 to pivot, thus extending the spring 138. As the magnets 144 (mounted on the dancer arm 132) approach the magnet sensor 146, the tension is at an optimal range for liner N take-up. However, if the motor 21 continues to turn the rewind roll 20, tension in the liner N continues to increase and the liner N may eventually tear. In this manner, there is a balancing of motor 21 rotation and dancer arm 132 (height) to control the liner N tension. Conversely, if the motor 21 stops, too much slack may be present in the liner N, and insufficient tension is produced for separating the labels L from the liner N.

In order to establish the proper tension balance, the rewind motor 21 is controlled to apply a rotation distance proportional to the time elapsed from when the dancer arm 132 leaves the home position. If the dancer arm 132 slowly leaves the home position, the rewind motor 21 speed is increased to bring the arm 132 into position. Conversely, an abrupt change in dancer arm 132 position results in a slow increase in rewind motor 21 speed. This arrangement prevents oscillation (rapid increases and decreases in rewind motor 21 speed) which could otherwise cause tension spikes in the liner N.

In order to provide proper tension for initial peel of the label L from the liner N, the start of print is accomplished with an increase in rewind motor 21 speed for a predetermined period of time. In carrying this out, tension is increased briefly by forcing the dancer arm 132 beyond the set tension. Continued feed then results in a relaxation of the dancer arm 132 moving toward the home position. This provides the required tension for the initial peel or separation of the label L from the liner N, without continuously over-tensioning the liner N.

All patents referred to herein, are hereby incorporated herein by reference, whether or not specifically do so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover all such modifications as fall within the scope of the invention.

What is claimed is:

1. A label applicator of the type for separating labels from a continuous carrier strip and applying the labels to an object positioned at the applicator, the applicator having a supply roll and a rewind roll, the supply and rewind rolls being driven for moving the strip therethrough, the applicator comprising:

a supply disk positioned coaxially on the supply roll, the supply disk having a plurality of equally spaced openings therein;

a sensor for sensing the passing of the supply disk openings;

a counter for counting the openings passing the sensor;

means for determining a level of labels remaining on the supply roll;

a tamp pad for applying the labels to the object; and a rewind roll for receiving the carrier strip after the labels have been separated therefrom.

2. The label applicator in accordance with claim 1 wherein the means for determining the level of labels includes a controller.

3. The label applicator in accordance with claim 2 wherein the level of labels is determined by $R=[(L_L)(T)]/[2\pi(T_{acc})]$, where R is a radius of supply roll, $L_L$ is a length of the label, T is the number of spaced openings in one revolution of the supply disk and $T_{acc}$ is the number of spaced openings counted when a label was printed.

4. The label applicator in accordance with claim 1 wherein the sensor is an optical sensor.

5. The label applicator in accordance with claim 1 wherein the supply disk is mounted to a supply roll hub.

6. The label applicator in accordance with claim 1 wherein the supply disk is mounted at a rear of the supply roll and wherein the sensor is mounted overlying a periphery of the supply disk at the supply disk openings.

7. A label applicator of the type for separating labels from a continuous carrier strip and applying the labels to an object positioned at the applicator, the applicator having a supply roll and a rewind roll, the supply and rewind rolls being driven for moving the strip therethrough, the applicator comprising:

a supply disk positioned coaxially on the supply roll;

means for identifying discrete portions of rotational movement of the supply disk;

means for counting movement of the discrete portions;

means for determining a level of labels remaining on the supply roll;

means for moving the labels to the object; and a rewind roll for receiving the carrier strip after the labels have been separated therefrom.

8. The label applicator in accordance with claim 7 wherein the means for identifying is a plurality of openings in the supply disk.

9. The label applicator in accordance with claim 7 wherein the means for counting includes a sensor.

10. The label applicator in accordance with claim 9 wherein the sensor is an optical sensor.

11. The label applicator in accordance with claim 7 wherein the means for determining the level of labels includes a controller.

12. The label applicator in accordance with claim 7 wherein the level of labels is determined by $R=[(L_L)(T)]/[2\pi(T_{acc})]$, where R is a radius of supply roll, $L_L$ is a length of the label, T is a number of equally spaced discrete portions of rotational movement of the supply disk in one revolution of the supply disk and $T_{acc}$ is a cumulative number of equally spaced discrete portion of rotational movement of the supply disk when a label was printed.

13. An unwind sensor for a label applicator of the type for separating labels from a continuous carrier strip and applying the labels to an object positioned at the applicator, the applicator having a supply roll having a supply disk with a plurality of equally spaced openings therein, a rewind roll and a tamp pad for applying the labels to the objects, unwind sensor configured for determining when a predetermined level of labels remains on the supply roll, the label applicator further including a controller, the unwind sensor comprising:

a sensor for sensing the passing of the supply disk openings;

a counter for counting the openings passing the sensor; and means for determining a level of labels remaining on the supply roll.

14. The unwind sensor in accordance with claim 13 wherein the means for determining the level of labels includes a controller.

15. The unwind sensor in accordance with claim 13 wherein a level of labels is determined by $R=[(L_L)(T)]/[2\pi(T_{acc})]$, where R is a radius of supply roll, $L_L$ is a length of the label, T is the number of spaced openings in one revolution of the supply disk and $T_{acc}$ is the number of spaced openings counted when a label was printed, and wherein the level of labels is compared to the predetermined level of labels and wherein a difference between the level of labels and the predetermined level of labels is determined.

16. The unwind sensor in accordance with claim 13 wherein the sensor is an optical sensor.

* * * * *